INVENTORS
Harold Edward Cable and
Herbert Edward Cable

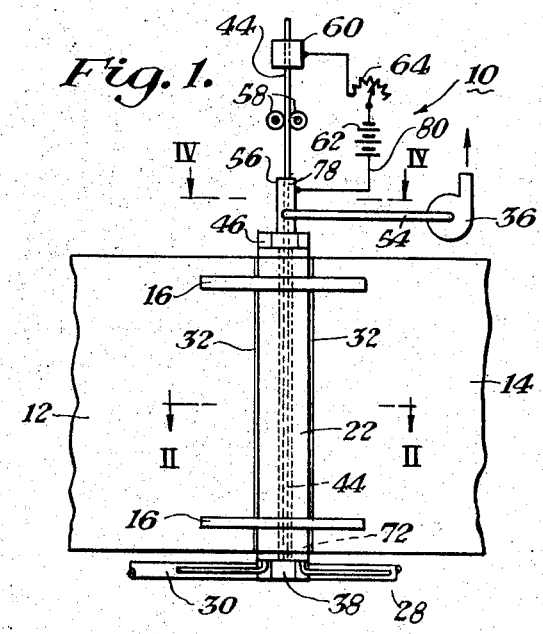

United States Patent Office 3,535,490
Patented Oct. 20, 1970

3,535,490
MEANS AND METHODS FOR WELDING AND THE LIKE
Harold Edward Cable, Thornburg, and Herbert Edward Cable, Mount Lebanon Township, Allegheny County, Pa., assignors to Weld Tooling Corporation, Pittsburgh, Pa., a corporation of Pennsylvania
Filed Nov. 21, 1967, Ser. No. 684,845
Int. Cl. B23k 9/00
U.S. Cl. 219—130     18 Claims

ABSTRACT OF THE DISCLOSURE

Welding apparatus is disclosed including an elongated electrode or ribbon strip coated with insulating and fluxing material for close-fitting insertion in a gap between steel plates or other members to be welded. The width of the electrode strip is substantially the same as the thickness of the members to be joined, while the thickness of the electrode is substantially equal to the width of the gap. A pair of water-cooled chill bars can be sealingly engaged upon either side of the gap and are sealed along their lateral edges and at their ends to permit evacuation of the gap prior to welding. The members are positioned by steel "strongbacks" spaced along the length of the gap and rigidly but temporarily secured to the members. Alternatively, a pair of structural channels, angles and such members can be utilized in place of the strongbacks on either side of the gap and rigidly joined to the members. The latter supporting channels, angles or such can be sealed instead of the chill bars, and the chill bars can be urged into thermally and electrically conductive engagement with the members by springs interposed between the sealed or unsealed structural channels or such and the chill bars.

---

The present invention relates to methods and means for butt-welding and the like operations, and more particularly to the butt-welding of elongated seams or joints between steel plate and the like. Specifically, but not necessarily, certain arrangements of the invention are directed to the welding of extremely elongated seams under vacuum conditions.

Various methods and apparatus for electric arc welding have been in use for many years. Unfortunately, conventional methods and apparatus for butt-welding relatively thick plates are very time consuming and sometimes relatively ineffective in that joints of insufficient strength are produced. It has been necessary to weld on both the forward and reverse sides of abutting plates along the junction therebetween in order to obtain sufficient weldment between the opposing edges of the plates. This results in a welded joint which is substantially thicker than the thickness of the plate. Frequently when the weldment is ground off flushly with the plate surfaces the welded joint is intolerably weak owing to the lack of penetration of sufficient weld metal into the gap or porosity or slag inclusions in the weld metal in the area between the abutting plates. This process is further complicated where the junctions between the abutting plates are extremely long, and the joint being welded is subject to operational error in that too short or too long an arc may be established from time to time between the manually held welding electrode and the plates being joined. In those cases where the welding is done by automatic welding equipment, complicated and cumbersome mechanisms are required for tracking the electrode and for adjusting the rate of electrode feed along the length of the weld.

Conventional methods and apparatus for effecting abutment welds frequently necessitate beveling the adjacent edges of each of the abutting surfaces to be joined to form one or more grooves at the joint to permit penetration of molten metal into the area between the abutting surfaces. This is usually required where the thickness of the weldment must not be substantially greater than the thickness of the plates or other work pieces being joined.

In those applications wherein the weld desirably is made under vacuum conditions, the aforedescribed disadvantages of conventional welding means and methods are considerably aggravated. For example, an extremely large and cumbersome vacuum chamber would be required for the extremely long weldments contemplated by our invention. Conventional vacuum chambers entail high pumping capacities to combat the inevitable leakage and to evacuate the chambers within a reasonable time. The use of the vacuum chamber, complicates, if it does not render impossible, the use of manual welding processes. It also complicates the use of automatic welding equipment.

For these reasons, vacuum welding has not been feasible for use in the vast majority of repetitive or productional welding operations. Nevertheless, it is well known that vacuum welding considerably improves the quality of the finished weld. The use of vacuum in any welding operation removes gaseous contaminants from the weld area and produces superior welds, while permitting a reduction of heat input and of melted metal for a given joining process.

We overcome these disadvantages of conventional welding means and methods by the provision of a unique weld electrode which is particularly useful in welding the abutting edges of relatively thick steel and other metallic plate material where it is essential to provide thoroughly fused weld metal between the plates and coextensive with the abutting edges thereof. The disclosed welding methods and apparatus including the aforementioned electrode are particularly useful for making elongated weldments of the character described and for welding under vacuum conditions when required. We also provide novel means for preventing overheating of the plate material adjacent the weldment as the weld is being made and for limiting the thickness of the weldment. We also provide novel means for adding the required filler metal to the joint as the weld is being made and for simultaneously fluxing the joint. With this arrangement weld metal can penetrate the junction without the necessity of beveling the edges of the parts to be joined. We also provide novel means for enclosing the joint to be welded so that the welding can be accomplished under vacuum conditions. The aforementioned weld enclosing means can be associated either with our novel weld cooling means or with novel means, also provided by our invention, for aligning the plate members and the like to be joined.

We accomplish these desirable results by providing a welding electrode comprising an elongated ribbon, strip or bar of metallic weld filler material, and a coating or sleeve or strips of electrically insulating and weld fluxing material surrounding and/or adhered to each side surface of said electrode strip or the like, said coatings being coextensive of said strip or like surfaces.

We also provide apparatus for butt welding members to be joined thereby, said apparatus comprising means for positioning said members with a gap therebetween, a welding electrode closely but movably fitted in said gap, an electrically insulating and weld fluxing coating or sleeve surrounding and/or adhered to said electrode, and means for applying an electrical welding potential between said members on the one hand and said electrode on the other.

We also desirably provide welding apparatus wherein at least one conductive chill bar is secured in thermally and electrically conductive relation to said members along the length of the junction therebetween.

We also desirably provide welding apparatus wherein a pair of such chill bars are provided on both weld edge exposure surfaces of said members respectively, and means are provided for sealing each of said chill bars to said members to sealingly enclose said gap, and means for evacuating the sealed volume enclosed by said bars including said gap.

We also desirably provide welding apparatus wherein means are provided for moving said electrode in a direction parallel to said gap and toward and away from an arc striking member positioned at one end of said gap.

We also desirably provide welding apparatus wherein said member positioning means includes a pair of continuous channel or other stiffening sections rigidly secured to said members and co-extending with said gap, said channel or other members being mounted on opposite sides of said gap respectively, means for sealing said channel or other sections to said members to be joined, and means for evacuating the sealed channel or other sections including the gap enclosed therebetween.

We also desirably provide a method for butt-welding a pair of conductive members, said method comprising the steps of spacing said members to form a relatively narrow gap therebetween along a line of intended junction, rigidly joining said members in such spaced relation to maintain said gap, establishing an electrically conductive path between said members to maintain said members at unipotential, passing an insulated welding electrode of cross section approximating that of the gap longitudinally through said gap, and applying opposite potentials to said electrode on the one hand and to said electrically connected between members on the other.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein:

FIG. 1 is an elevational view of one form of welding apparatus arranged in accordance with our invention;

FIG. 2 is an enlarged, partial cross-sectional view of the apparatus shown in FIG. 1 and taken along reference line II—II thereof;

FIG. 3 is an enlarged, partial bottom plan view of the apparatus shown in FIG. 1;

FIG. 4 is an enlarged, partial cross-sectional view of the apparatus shown in FIG. 1 and taken along reference line IV—IV thereof;

FIG. 5 is a cross-sectional view similar to FIG. 2 but showing a modified arrangement of our welding apparatus;

FIG. 6 is a similar view showing another form of our welding apparatus;

Figure 7:
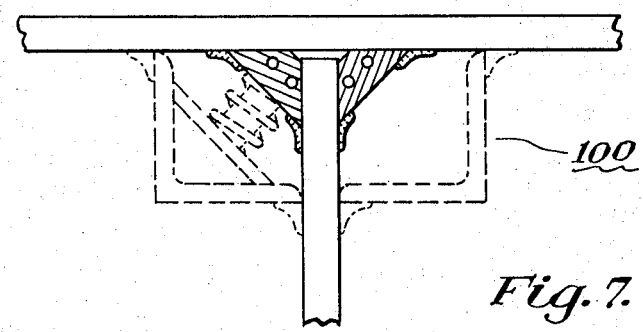
FIG. 7 is a cross-sectional view showing a further form of our welding apparatus applied to T-joints.

Referring now to FIGS. 1–4 of the drawings in greater detail, one arrangement of our novel welding apparatus 10 is utilized in this example for joining and butt welding a pair of relatively thick steel plates 12 and 14 or the like. The plates 12, 14 are prepositioned for the welding operation by a plurality of steel "strongbacks" 16 spaced along the length of the joint therebetween on either or both of the forward and reverse sides of the plates as better shown in FIG. 2. The strongbacks 16 can be temporarily welded to the adjacent plate surfaces or otherwise rigidly secured to the plate. When the plates 12, 14 are thus positioned a gap (FIG. 2) of predetermined width is established between their abutting edges faces 18, 20 respectively.

A pair of chill bars 22 and 24 are placed on both sides of the joint to be formed between the plates 12 and 14 as better shown in FIG. 2. The bars 22, 24 preferably co-extend with the length of the junction between the plates as shown in FIG. 1. The bars 22, 24 are fabricated from a good electrically and thermally conductive material, such as copper, to conduct excess heat from the juxtaposed portions of the plates 12 and 14 to promote solidification and reduce distortion. A path of high electrical and thermal conductivity is thus established between the plates 12 and 14 by bars 22, 24. As described below, means are provided for urging the chill bars 22, 24 into substantially contiguous contact with the plates 12, 14 to bridge the gap therebetween. Thus, the plates 12, 14 can be maintained substantially at the same potential during the welding process as described hereinafter.

It will be understood, of course, that only one of the bars 22, 24 need be used in many applications where the junction bridged is not evacuated.

Desirably, the heat transferred to the bars 22, 24 is dissipated by one or more longitudinal coolant passages 26 therein which are coupled adjacent the ends of the chill bars 22, 24 to supply and return headers 28 and 30 (FIG. 3). A suitable coolant fluid such as water is circulated through the passages 26 of chill bars 22, 24 throughout the welding operation. A thermostat or aquastat (not shown) can be coupled to one of the passages 26 and to a source of coolant fluid (not shown) to control the temperature of the chill bar or bars.

As better shown in FIGS. 1 and 2, for vacuum welding operations each of the chill bars 22 and 24 is provided with a pair of lateral sealing strips 32 co-extending therewith and desirably bonded to the respective sides of each bar 22 or 24. As better shown in FIG. 2 each of the sealing strips 32 is provided with a flat surface which engages the adjacent one of the plates 12, 14 in overlying and underlying relationship as the case may be. As likewise shown in FIG. 2 each of the chill bars 22, 24 is provided with a relatively shallow groove 34 extending longitudinally and intermediately of the side edges of the inward surface of the bar 22 or 24. The grooves 34 afford space for the collection of fused fluxing material, as described hereinafter, as the weldment progresses along the apposing edges 18, 20 of the plates 12, 14 and also provides an avenue for the evacuation of the junction prior to welding of the edges 18, 20. When air is withdrawn from the chill bar grooves 34 and the gap between the plate edges 18, 20 by pump 36 (FIG. 1) the sealing strips 32 are pressed into sealing engagement with the adjacent surfaces of the plates 12, 14 by the greater atmospheric pressure. In furtherance of this purpose the strips 32 are fabricated from rubber or from a resilient synthetic elastomeric material. Where elevated temperatures are encountered a siliconic elastomer, or the like, is employed which can withstand the temperature. Of course, the maximum temperature is controlled when using the cooled chill bars of our invention. Before commencing the evacuation process, the ends of the sealed bars 22, 24 are sealed, desirably as shown in FIGS. 1, 3 and 4. The lower ends of the bars 22, 24 as viewed in FIG. 1, are sealed by seal block 38 the outer edges of which are provided with a peripheral sealing strip 40 which can be similar in cross section and in material to that of the sealing strips 32. As better shown in FIG. 3, the sealing block 38 and its strip 40 are encompassed by the end surfaces of the bars 22, 24 and the adjacent edge surfaces of plates 12, 14 which desirably are mounted flushly therewith. In this example, the sealing block 38 is of octagonal configuration to provide clearance for coolant channels 26 and their connecting conduits 42. Desirably the inner surface of the sealing block 38 is in contiguous contact with at least one of the juxtaposed surfaces so that the sealing block 38 can be employed for striking the arc from a preliminary and momentary engagement thereof by an electrode ribbon 44, the structure of which is described hereinafter.

The upper ends of the bars 22, 24 are similarly sealed by upper sealing block 46 provided with a similar sealing lip 48. The upper sealing block 46, however, is furnished with central aperture 50 to accomodate the passage of the electrode 44 and with lateral aperture 52 which is tapped for threaded engagement with conduit 54 which in turn can be connected to the aforementioned pump 36 when it is desired to evacuate the chamber thus formed by the elongated bars 22, 24 and their end seals 38, 46. For vacuum welding, the upper sealing block 46 is sealed to the movable electrode 44 by means of an elongated bellows 56 or a sliding seal.

The welding electrode 44 in this example passes between a pair of guide rollers 58 and is moved parallel to the juxtaposed plate edges 18, 20 by linear motor 60 or other suitable servo-mechanism desirably actuated by a source of welding current including, for example, a variable voltage generator 62 with control 64. Thus, the rate of electrode insertion is made proportional to the welding arc voltage so that the electrode 44 is fed more or less rapidly depending upon the demand for filler metal.

In this arrangement the welding electrode 44, as better shown in FIG. 2, includes a central strip 66 of conventional weldment filler metal coated on both side surfaces with a layer of electricaly insulating ceramic material such as fiberglass or solid glass 68 and 70 respectively. Desirably the insulating ceramic layers 68, 70 also include desired fluxing agents such as lime, magnesia and silica and can be of requisite thickness as determined by welding conditions such as welding voltage, thickness of plates 12, 14 and of the electrode strip 66. Typically the coatings may vary between ten and fifty mills in thickness. The thickness of the central metal strip 66 likewise can be varied and typically can have a thickness of about $\frac{1}{16}$ inch to about $\frac{1}{4}$ inch. On the other hand the widths of the strip 66 and the coating layers 68, 70 desirably are made approximately equal to the thickness of the plates 12, 14 being joined. In most applications the length of the electrode 44 is about ten to twenty-five percent greater than the length of the junction between the plates 12, 14 being welded to supply the required weld metal.

When welding the plates 12, 14, which are positioned as aforestated by strongbacks 16, the gap between their opposing edges 18, 20 desirably is sized to closely receive the electrode 44 in its fully inserted position as shown in FIG. 1. The ribbon electrode 44 thus is almost entirely confined within the gap between the plates 12, 14 save for the ten to twenty-five percent thereof mentioned above and initially protruding upwardly from the gap (as viewed in FIG. 1) in the longitudinal direction thereof. To ensure a proper width of such gap the electrode 44 can be inserted between the apposing edges 18, 20 of the plates 12, 14 in easy fitting engagement before the strongbacks 16 are rigidly secured to the plates. Following this operation the chill bars 22, 24 and end sealing blocks 38, 46 can be added to the assembly if the joint is to be evacuated during the welding. If the joint is not to be evacuated a suitable piece (not shown) of conductive material is joined in a place of the lower sealing block 38 (FIG. 1), as by tack welding, to aid in striking an arc at the bottom of the joint when the strip electrode is fully and longitudinally inserted into the gap to make initial electrical contact therewith.

The lower end 72 (FIG. 1) of the electrode 44 is uncoated with insulating material to permit striking the arc at the lower sealing block 38 or with another conductive member (not shown) and to permit electrical connection to source 62 through electrical contacts 78 and conductor 80. As described above the rate of movement of the electrode 44 is made proportional to welding voltage to attain an optimum feed of filler metal. Desirably, the linear motor 60 or the like is reversible to permit withdrawing the electrode 44 for example immediately after the arc is struck against the bottom sealing block 38 or the like.

The sealing strips 32, 40 and 48 can be fabricated from a silicone rubber or other elastomeric material which has a good resistance to high temperatures. However, elevated temperatures in those areas adjacent the aforementioned sealing strips are avoided by the aforementioned coolant system incorporated in the chill bars 22, 24.

As pointed out previously the grooves 34 of the chill bars 22, 24 provide sufficient free area outwardly of the welded joint and on either side thereof to accommodate the melted flux composition which chills and solidifies against the bar 22, 24. On the other hand, the gap between the juxtaposed plate edges 18, 20 is completely filled by weld metal so that the cross section of the resultant weldment will be equal to or only slightly greater than the thickness of the plates 12, 14.

For the current source 62, indicated schematically in FIG. 1, a welding generator of either the drooping voltage or the constant potential characteristic is satisfactory for our novel welding arrangement. For most applications the plates 12, 14 or other members being joined are connected to the positive side of the arc, while the electrode 44 is connected to the negative side of the arc. With certain compositions of metal or with certain compositions of insulating and flux layers 68, 70, however, improved results can be obtained by reversing this polarity connection or by using an alternating current source.

From the foregoing it will be apparent that novel and efficient welding apparatus of a versatile nature have been disclosed herein. For example, our novel electrode 44 and associated components can be employed without a corresponding usage of our novel means for evacuating the junction during the welding process. In either case the electrode 44 is fed downwardly (as viewed in FIG. 1) into the molten pool as the weld progresses upwardly so as to maintain a relatively uniform arm length or submerged melt pool and to provide the necessary filler metal to complete the weldment. The electrode 44 moreover is fed longitudinally through the gap between the members being welded. It follows that the gap is entirely filled with weld metal for the strongest possible joint.

The arc voltage is varied and controlled so as to be compatible with the composition of the metals being joined, the thickness and temperature of the plates 12, 14 or other pieces, the configuration of the electrode 44 and the known flux composition utilized for the coatings 68, 70. The current through the electrode 44 therefore is at the maximum which the electrode can carry without excessive softening from internal resistance heating. This permits the welding to progress at the maximum rate while insuring proper but minimum fusion of both plate edges 18, 20. Desirably, the temperature of the coolant fluid passing through the chill bars 22, 24 is thermostatically controlled (not shown), to attain a proper rate of slag solidification and appropriate fusion of the weld metal without undercutting the plate edges 18, 20.

Our novel electrode 44 can be fabricated from any appropriate conventional composition customarily used in making welding electrodes. The electrode 44 permits filler metal to be inserted from a direction diametrically opposed to that of the moving weld front so that a maximum of fused metal is disposed directly between the juxtaposed plate edges 18, 20 to ensure a weldment of maximum strength. More particulraly, our novel welding electrode permits fused metal to be inserted directly in a narrow gap between plates or other relatively thin members.

With the remainder of our novel welding apparatus, as shown in the drawings, a large variety of welds can now be made in a controlled atmosphere, which removes gaseous contaminants from the immediate welding area to produce a superior weld with a minimum heat input and a minimum amount of filler metal. The effectiveness but relative simplicity of our novel evacuational apparatus permit the use of vacuum welding techniques in many common welding applications not hitherto possible.

Figure 8:
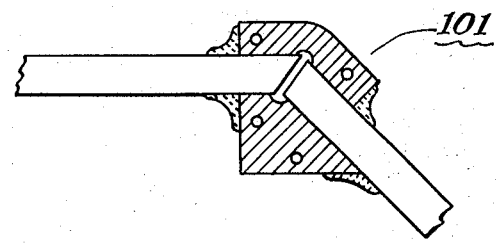
FIG. 8 is a cross-sectional view showing a form of our welding apparatus applied to an angled butt joint.
Figure 9:
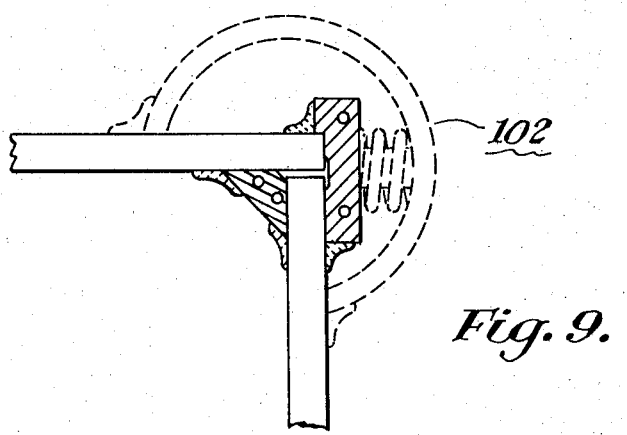
FIG. 9 is a cross-sectional view showing a form of our apparatus applied to an edge butt.

Similar arrangements for evacuating the junction to be welded during the welding process are illustrated in FIG. 5 through 9 of the drawings. In the arrangement of FIGS. 5 and 6 strongbacks 16 (FIGS. 1 and 2) may be eliminated and continuous connecting channels 82 or 84 are rigidly but temporarily secured to plates 12' and 14' to dispose the plates in edgewise juxtaposition with electrode 44' therebetween. The channels 82 or 84 are provided with sealing strips 86 or 88 similar to the strips 36 of FIGS. 1 and 2. Suitable end sealing blocks (not shown) are provided for the channels 82 or 84 and are generally similar to the upper and lower sealing blocks 46, 38 of FIGS. 1 and 3. Similarly in FIGS. 7–9 connecting channels or angles 100, 101, 102 may be rigidly but temporarily secured to the plates to be connected as in FIGS. 5 and 6. The chill bars and other accessories are used as described above.

A pair of channels 82 or 84 thus enclose a space 90 or 92 therebetween respectively which is evacuated by a suitable pump (not shown) such as the pump 36 in FIG. 4. The chill bars 22' and 24' can be so movably contained either by springs 94 or 96 or by a flexible tube 98 such as a piece of hose between the bar and the support channel. The tube end, open to atmosphere, allows atmospheric pressure to inflate the tube and force the chill bar against the pieces to be welded. Auxiliary air may, of course, be applied to the tube. The chill bars 22' and 24' may alternatively be held in thermally and electrically conductive engagement with the plates 12' and 14' by means of springs 94 or 96 which are compressed between the associated channels 82 or 84 and the chill bars 22', 24' when the positioning channels 82 or 84 are rigidly secured to the plates 12', 14' as by atmospheric pressure. If desired the channels 82 or 84 can be provided with spring locating tabs or retracting support cams such as the tabs or retractor support 98 shown in FIG. 6 to control displacement of the biasing springs from the chill bars 22, 24.

In the arrangement of our invention as shown in FIGS. 1 and 4, similar springs or support bars (not shown) can be positioned, if desired, between one or more of the strongbacks 16 and the adjacent chill bar 22 or 24 on either side of the gap bridged by the chill bar or bars. In this arrangement the chill bars or bar can be held entirely by the springs or bars when the junction is not evacuated, or the pair of chill bars 22, 24 can be initially positioned by the springs until a vacuum is drawn to hold and seal the bars by the force of ambient atmospheric pressure.

The flux material surrounding the strip may be in the form of a conventional coating as disclosed hereinabove or it may be a woven sleeve of glass-like fibers of fluxing material or ribbons of glass-like fluxing material applied to both sides of the electrode.

While we have shown and described certain presently preferred embodiments of the invention and have illustrated presently preferred methods of practicing the same, it is to be distinctly understood that the invention is not limited thereto but may be variously embodied and practiced within the scope of the following claims.

We claim:

1. Apparatus for butt welding members to be joined thereby, said apparatus comprising means for positioning said members with a gap therebetween, a welding electrode closely but movably fitted in said gap, an electrically insulating and weld-fluxing coating surrounding said electrode, said electrode substantially filling said gap when inserted therein, means for applying an electric welding potential between said members on the one hand and said electrode on the other, a pair of conductive chill bars secured in thermally and electrically conductive relation on the forward and reverse surfaces of said members respectively, and extending along the length of the junction therebetween, means for sealing each of said chill bars to said members to sealingly enclose said gap, and means for evacuating the sealed volume enclosed by said bars including said gap.

2. The combination according to claim 1 wherein said sealing means include a conductive end plate sealed to said chill bars adjacent an end of said gap other than the electrode-entry end thereof and positioned in arc striking relationship to said electrode when the latter is juxtaposed to said end plate.

3. Apparatus for butt welding members to be joined thereby, said apparatus comprising means for positioning said members with a gap therebetween, a welding electrode closely but movably fitted in said gap, an electrically insulating and weld-fluxing coating surrounding said electrode, said electrode substantially filled said gap when inserted therein, means for applying an electric welding potential between said members on the one hand and said electrode on the other, said member positioning means including a pair of continuous channel sections rigidly secured to said members and coextending with said gap, said channel members being mounted on opposite sides of said gap respectively, means for sealing said channel sections to said members to be joined, and means for evacuating the sealed channel sections including the gap enclosed therebetween.

4. The combination according to claim 3 wherein a pair of chill bars are mounted on either side of said gap respectively, said chill bars being spaced inwardly of said positioning channels, and biasing means are mounted between said positioning channels and the associated one of said chill bars respectively for urging said chill bars into thermally and electrically conductive engagement with said members.

5. A method for butt welding a pair of conductive members, said method comprising the steps of spacing said members to form a relatively narrow gap therebetween along a line of intended junction, rigidly supporting said members in such spaced relation to maintain said gap, establishing an electrically conductive path between said members to maintain said members at unipotential, conforming an electrode to substantially fill said gap by making the cross section configuration of said electrode substantially identical to that of said gap, sealing and evacuating said gap, passing said welding electrode longitudinally through said gap, but applying opposite potentials to said electrode on the one hand and to said electrically connected members on the other.

6. The method according to claim 5 wherein said gap is closed and is evacuated prior to and during the welding of said members.

7. Apparatus for butt welding members to be joined thereby, said apparatus comprising means for positioning said members with a gap therebetween, a welding electrode closely but movably fitted in said gap, an electrically insulating and weld-fluxing coating surrounding said electrode, said electrode substantially filling said gap when inserted therein, means for applying an electric welding potential between said members on the one hand and said electrode on the other, and means for sealing and evacuating said gap.

8. Apparatus for butt welding members to be joined thereby, said apparatus comprising means for positioning said members with an elongated gap therebetween, a welding electrode closely but movably insertable into said gap, an electrically insulating and weld-fluxing coating on those outer surfaces of said electrode which are parallel to said members, said electrode together with said coating having substantially the same cross sectional configuration as that of said gap, means for applying an electric welding potential between said members on the one hand and said electrode on the other, and means for inserting said electrode lengthwise of said gap, and means for sealing and evacuating said gap.

9. The combination according to claim 8 wherein the width of said gap and said electrode is substantially the same as the thickness of said members in the area of the junction therebetween, and said electrode is at least coextensive with the length of said gap.

10. The combination according to claim 8 wherein said coating is at least coextensive with the width of said electrode so that said coating in turn is coextensive with the width of those surfaces of said members which are juxtaposed to said gap.

11. The combination according to claim 8 wherein at least one conductive chill bar is secured in thermally and electricaly conductive relation to said members along the length of the junction therebetween.

12. The combination according to claim 11 wherein means are provided for controlled cooling of said chill bar.

13. A combination according to claim 8 wherein means are provided for moving said electrode relatively slowly and longitudinally through said gap.

14. The combination according to claim 8 wherein means are provided for moving said electrode in a direction parallel to said gap and toward and away from an arc striking member positioned at one end of said gap.

15. The combination according to claim 14 wherein said electrode moving means includes electrical actuating means coupled to a source of welding current for feeding said electrode longitudinally into said gap at a rate proportional to the arc voltage.

16. A combination according to claim 14 wherein said moving means are disposed so as to be capable of moving said electrode longitudinally through said gap from the other end of said gap.

17. A combination according to claim 8 wherein said electrode includes an elongated strip of metallic weld filler material and a coating thereon which when solidified is electrically insulating and when molten is weldfluxing, said coating covering each side surface of said strip, said coating being co-extensive with said strip surfaces.

18. A combination according to claim 17 wherein said coating is a woven sleeve of glass-like fibers of flux material and substantially covers said electrode strip.

References Cited
UNITED STATES PATENTS

| | | | |
|---|---|---|---|
| 2,938,107 | 5/1960 | Pease | 219—131 |
| 3,197,604 | 7/1965 | Turbyville | 219—73 |
| 3,337,712 | 8/1967 | Lucey | 219—73 X |

JOSEPH V. TRUHE, Primary Examiner

C. L. ALBRITTON, Assistant Examiner

U.S. Cl. X.R.

219—137

UNITED STATES PATENT OFFICE
CERTIFICATE OF CORRECTION

Patent No. 3,535,490                                         October 20, 1970

Harold Edward Cable et al.

It is certified that error appears in the above identified patent and that said Letters Patent are hereby corrected as shown below:

Column 2, line 47, "edegs" should read -- edges --. Column 3, line 34 after "connected" cancel "between". Column 5, line 21, after "60" insert -- having electric actuating or control means (not shown) --; line 32, "electricaly" should read -- electrically --; line 67, after "in" cancel "a". Column 6, line 43, "arm" should read -- arc --; line 68, "opposed" should read -- apposed --; line 71, "particulraly" should read -- particularly --. Column 8, line 21, "filled" should read -- filling --; line 51, "but" should read -- and --. Column 9, line 17, "electricaly" should read -- electrically --.

Signed and sealed this 6th day of April 1971.

(SEAL)
Attest:

EDWARD M. FLETCHER, JR.                         WILLIAM E. SCHUYLER, JR.
Attesting Officer                                Commissioner of Patents